(12) United States Patent
Carberry

(10) Patent No.: US 12,192,754 B1
(45) Date of Patent: Jan. 7, 2025

(54) NETWORK MANAGEMENT OF REMOTE DEVICES IN TELECOMMUNICATIONS ENVIRONMENT

(71) Applicant: Modius Inc., Los Altos, CA (US)

(72) Inventor: Mark Carberry, San Francisco, CA (US)

(73) Assignee: Modius, Inc.

( * ) Notice: Subject to any disclaimer, the term of this patent is extended or adjusted under 35 U.S.C. 154(b) by 0 days.

(21) Appl. No.: 16/998,974

(22) Filed: Aug. 20, 2020

(51) Int. Cl.
*H04W 12/00* (2021.01)
*H04Q 9/04* (2006.01)

(52) U.S. Cl.
CPC ............ *H04W 12/009* (2019.01); *H04Q 9/04* (2013.01)

(58) Field of Classification Search
USPC ......................................................... 709/223
See application file for complete search history.

(56) References Cited

U.S. PATENT DOCUMENTS

| | | | |
|---|---|---|---|
| 2004/0147220 A1* | 7/2004 | Vaddiparty | H04L 67/12 455/12.1 |
| 2005/0002419 A1* | 1/2005 | Doviak | H04W 28/06 370/466 |
| 2013/0253853 A1* | 9/2013 | Wunderlin | G05B 23/0283 702/42 |
| 2014/0180610 A1* | 6/2014 | Chatterjee | G01F 1/8436 702/45 |
| 2015/0339911 A1* | 11/2015 | Coyne | G08B 27/005 340/517 |

* cited by examiner

*Primary Examiner* — Hermon Asres
(74) *Attorney, Agent, or Firm* — Los Altos Law

(57) ABSTRACT

An ERTU receives telemetry data locally from devices at a monitored site, using a real time monitoring protocols such as SNMP and Modbus. The ERTU can receive information from monitored devices using Ethernet or serial communications, wherein each selected type of monitored device is associated with a standardized address scheme. The ERTU transmits messages from that site to a centralized computer using a remote communication protocol, as agreed between the ERTU and the centralized computer, in a reliable and cybersecure manner. The centralized computer can associate the standardized address with the selected types of monitored devices, and can forward that information, or process that information itself, allowing an operator to correctly review and manage devices at the monitored site.

17 Claims, 2 Drawing Sheets

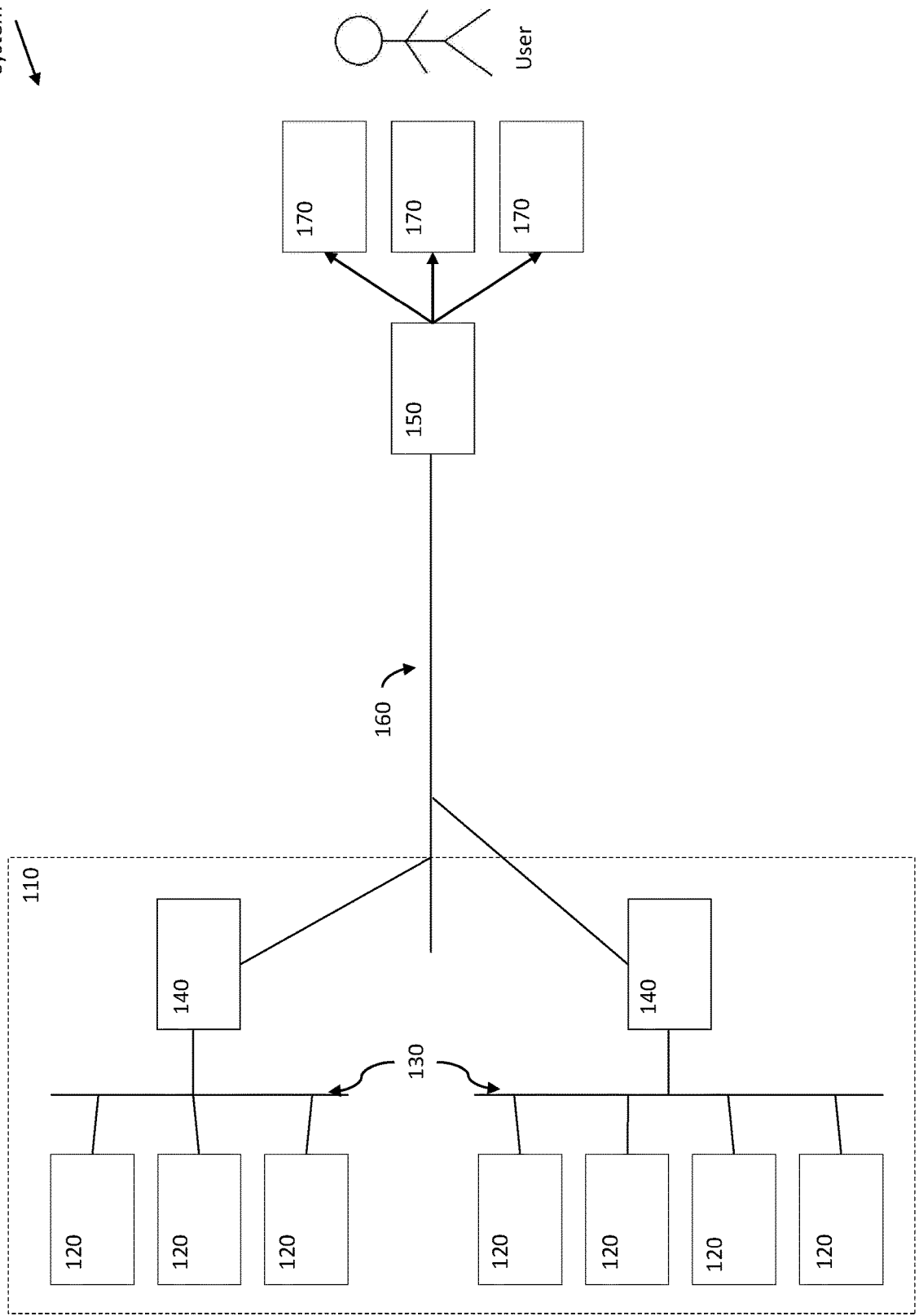

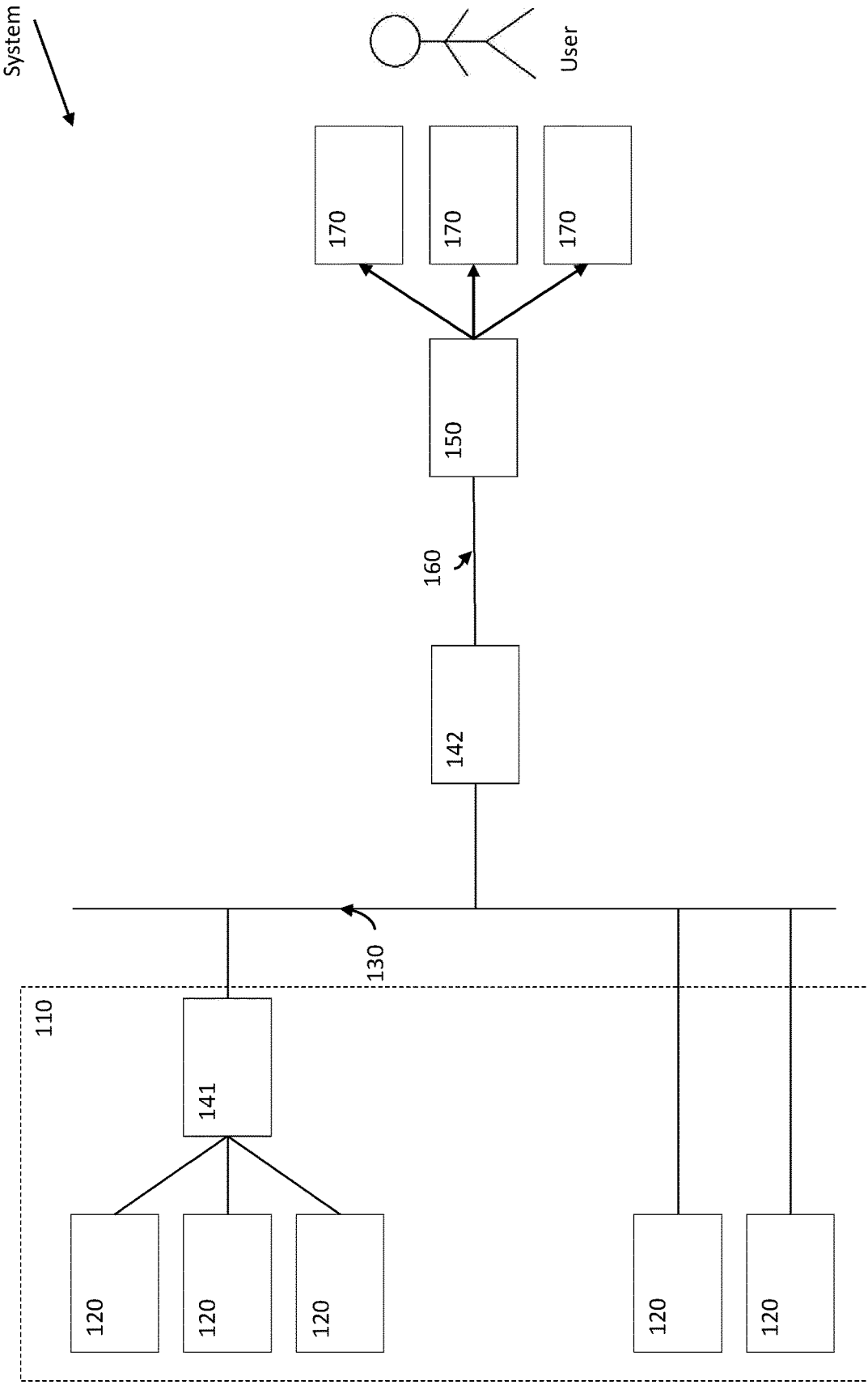

NETWORK MANAGEMENT OF REMOTE DEVICES IN TELECOMMUNICATIONS ENVIRONMENT

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

This background is provided as a convenience to the reader and does not admit to any prior art or restrict the scope of the disclosure or the invention. This background is intended as an introduction to the general nature of technology to which the disclosure or the invention can be applied.

Field of the Disclosure

This Application generally relates to management of remote devices, such as collecting information using remote telemetry. This Application describes systems and techniques that have particular value when used with telecommunication and related networks.

Related Art

One component of network management relies on remote telemetry units (RTUs) to monitor status at remote locations using hardwired physical sensors and contact closures. Sensor and closure readings are transmitted from the RTU to a centralized computer to provide operators a unified view of all devices at all remotely monitored locations.

While this method can be effective in sending telemetry information with respect to hardwired physical sensors and contact closures from monitored devices to a centralized computer, it has the drawback that the telemetry information is not always reliably delivered or cybersecure. The telemetry information from monitored devices involves the centralized computer having to know substantial information about those monitored devices, such as the particular hardwired physical sensors and contact closures at the monitored device used for obtaining that telemetry information, the encapsulation protocol for transmitting that telemetry information to the centralized computer, and the local addressing of individual monitored devices at the monitored site. The telemetry information from monitored devices is mostly collected as discrete events (e.g., episodically upon state changes that can be detected by physical sensors or contact closures) and does not provide either "real time" information or the ability to perform analytics or other processing in real time. Existing techniques for a monitoring in a telecommunications environment are not ready to support performance analytics due to inefficient information gathering and limited network bandwidth and computer processing which is inherent in most legacy systems.

Each of these issues, as well as other possible considerations, might cause difficulty in aspects of communicating information between monitored devices and a centralized computer.

SUMMARY OF THE DISCLOSURE

This summary of the disclosure is provided as a convenience to the reader and does not limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

Remote Telemetry Units

This Application describes a system, and methods for use, in which a distributed system, such as a telecommunications system, can enable a centralized computer to monitor devices at a plurality of sites, each site having devices to be monitored. At each site, an Edge remote telemetry unit (ERTU) can be installed to receive sensor information from its monitored devices, such as either by direct hardware connection or using a real time monitoring protocol (like SNMP, Modbus, DNP, BACnet, or otherwise). The ERTU provides transmitted messages from that site to the centralized computer using a reliable and secure remote communication protocol, such as a TCP/IP protocol stack, or a variant thereof.

The ERTU can be disposed to package status information it receives (from monitored devices) into messages (to the centralized computer) that are encrypted and use a protocol involving reliable delivery. The ERTU can standardize addressing, formatting, and timing of its messages. For example, this can enable the centralized computer to identify the status of individual devices at each site, without having to know how those individual devices are coupled to the ERTU or what information transport protocol those individual devices use when communicating with the ERTU. For another example, this can enable the centralized computer to receive information from the ERTU at defined times and in defined amounts, instead of whenever the monitored devices asynchronously report their status. In such cases, the ERTU can actively poll (or otherwise receive information from) the monitored devices to obtain status information when the ERTU determines that it is desirable to send that information to the centralized computer.

In one embodiment, the ERTU can be disposed to perform analytics on status information it receives from monitored devices at its site. Each ERTU can be disposed to send information derived from its analytics to the centralized computer. The centralized computer can receive information from the ERTUs, to provide a collective perspective on all sites. In one embodiment, the centralized computer can forward that information to other processors, or process that information itself, so as to allow an operator to (A) identify a status of the monitored location, (B) identify an alarm condition that might occur at the monitored location, (C) report on a trend with respect to the monitored location, or otherwise.

In one embodiment, the ERTU can be rack-mounted, locally grounded, and draw power over ethernet (POE) from its connection to a local network at the site. The ERTU can also be coupled to telecommunications power inputs, other power inputs, or battery power (such as a backup battery). In one embodiment, the ERTU can be disposed to be reconfigured, such as when the monitored devices at its site are changed or replaced.

In one embodiment, local communication between monitored devices and the ERTU can be performed using a LAN isolated to the site, in which the ERTU is disposed to receive information from the monitored devices on the LAN and to send that information, or a processed variant thereof, to the centralized computer, using a distinct network, as further described herein. In such cases, it should not be necessary to change any of the physical connections between the ERTU and the monitored devices.

In one embodiment, the ERTU can auto-discover individual devices at the site, so as to receive status messages from monitored devices at the site without necessarily being coupled using direct hardware connections and without having to configure the ERTU for the particular locations of devices at the site. In such cases, the ERTU can be disposed for deployment at the site without specialized wiring.

For another example, each ERTU can be disposed to communicate with the centralized computer using a WAN coupling the monitored sites with the device points to monitor, in which each monitored site is associated with a single known WAN address distinct from the LAN addresses used by each ERTU at its particular site. In such cases, communication between the ERTU and the centralized computer can be performed outside the bandwidth associated with the telecommunication network. This can have the effect that communication between the ERTU and the centralized computer can be performed without interfering with operation of the telecommunication network.

For another example, the system and methods can have a first (newer) RTU disposed to receive information from a second (legacy) RTU at the site. In such cases, the legacy RTU can collect information using hardwired physical sensors and contact closures from (at least some of) the monitored devices and can provide that information to the newer RTU. When devices at the site are upgraded to be able to use local network protocols, they can be coupled to the newer RTU and decoupled from the legacy RTU. When all such devices are decoupled from the legacy RTU, the legacy RTU can be removed from the site.

Alternative Embodiments

These and alternative embodiments can be disposed to address aspects of communication between monitored devices, remote telemetry units, and a centralized computer. While the Application primarily describes communication from monitored devices to a centralized computer, alternative embodiments can include the reverse communication, thus, from the centralized computer to one or more monitored devices. In such cases, the centralized computer, having authenticated itself to the RTU, can be disposed to query a monitored device for selected information, to alter the state of a monitored device, to issue commands to a monitored device, or otherwise.

BRIEF DESCRIPTION OF THE FIGURES

In the figures, like references generally indicate similar elements, although this is not strictly required.

FIG. 1 shows a conceptual drawing of an example system, including a set of monitored devices at a monitored location, an RTU disposed to receive information from those monitored devices, and a centralized computer disposed to receive information from the RTU.

FIG. 2 shows a conceptual drawing of an alternative example system, including a first set of monitored devices coupled to a legacy telemetry unit, which is in turn coupled to an ERTU.

After reading this Application, those skilled in the art would recognize that the figures are not necessarily drawn to scale for construction, nor do they necessarily specify any particular location or order of construction.

DETAILED DESCRIPTION

Terms and Phrases

The following terms and phrases are exemplary only, and not limiting.

The phrases "this application", "this description", and variants thereof, generally refer to any material shown or suggested by any portions of this Application, individually or collectively, and including all inferences that might be drawn by anyone skilled in the art after reviewing this Application, even if that material would not have been apparent without reviewing this Application at the time it was filed.

The terms "encrypted" or "obfuscated", and variants thereof, generally refer to any process or technique having a result substantially inaccessible to others without a key, shared secret, or technique for entry. For example, as used herein, encryption can include any process or function which cannot readily be reversed by observation of the results, without access to a key used to perform that process or function. For another example, as used herein, obfuscation can include any process or function which cannot readily be reversed by observation of the results, but from which some information can be retrieved by application of sufficient processing power or time.

The phrase "monitored device", and variants thereof, generally refers to any device disposed to receive (or otherwise determine) information from its environment. For example, a monitored device can include a temperature gauge, a power measurement device, a computing device, or any other device disposed to be capable as further described herein. The monitored device can include elements disposed to measure its environment, such as one or more sensors.

The phrase "monitored site", and variants thereof, generally refers to any physical or logical location at which monitored devices can be disposed in a physical or logical group. For example, a monitored site can include a set of monitored devices disposed in a particular rack mounting, a particular telephone pole, a particular room or building in a computing center, a particular city, or another physically or logically separate set of monitored devices. The monitored site can include a separate local area network to which its monitored devices are coupled and within which its monitored devices are assigned protocol addresses in a logically separate address space.

The phrase "operator input", and variants thereof, generally refers to information received from an operator, such as using a control device, or otherwise. For example, operator input can be disposed to select one or more sets of information from RTU's for display to the operator, The term "periodic", the phrase "from time to time", and variants thereof, generally refers to any timing process or technique other than continuously. For example, as used herein, a periodic operation can include one that occurs at regular intervals, at random intervals, at irregular intervals that are not random or are subject to internal or external factors, or otherwise.

The term "random", and variants thereof, generally refers to any process or technique having a substantially nonpredictable result. For example, as used herein, random processes include (1) physically random processes and functions, including those found in quantum mechanics, such as radioactive processes; (2) pseudorandom processes and functions, such as those found with respect to cryptographic and related pseudorandom functions; (3) any other processes and functions that are subject to internal or external factors not readily determinable by observation of results of those processes or functions, such as functions generated by processes not readily discernable from outside the generator thereof; and otherwise.

The phrase "real time", and variants thereof, generally refer to timing, particularly with respect to information from monitored devices, operating substantially in synchrony with real world activity, such as when a monitored device is changing its status with respect to the real world environment. For example, "real time" operation of a power system can include measurement by a monitored device of heating/cooling, current/voltage, and power activity substantially promptly in response to changes in its environment, rather than at some later time, such as a scheduled periodic measurement of its environment.

After reviewing this Application, those skilled in the art would recognize that these terms and phrases should be interpreted in light of their context in the specification.

Figures and Text

FIG. 1—RTU Packaging Received Information

FIG. 1 shows a conceptual drawing of an example system, including a set of monitored devices at a monitored site, an ERTU disposed to receive information from those monitored devices, and a centralized computer disposed to receive information from the ERTU.

Monitored Sites and Devices

A system 100 can include one or more monitored sites 110, each monitored site including one or more monitored devices 120 and disposed at a location associated with that monitored site. For example, each monitored site 110 can be disposed at a separate location, such as a first site in Boston, a second site in Chicago, a third site in Los Angeles, and the like. Although primarily described herein as being substantially distant, there is no particular requirement that the monitored sites 110 are so far apart; for example, each monitored site 110 can be associated with a separate building in a campus network, a separate room in a computing center, a separate telephone pole or other separate set of communication equipment, or otherwise distinguished as might be convenient for operation of the system 100.

At each monitored site 110, the monitored devices 120 can include power-generating devices, such as generators or power plants; device controllers or intelligent devices, such as HVAC controllers, programmable logic controllers (PLCs), or uninterruptable power supplies (UPSs); or other devices, such as IP cameras or other information technology (IT) equipment. In one embodiment, each of the monitored devices 120 can be coupled to a local area network (LAN) 130, such as a network operating using an Ethernet protocol or a variant thereof.

Although each monitored site 110 is primarily described herein as including "one or more" monitored devices 120, there is no particular requirement with respect to the actual number of monitored devices disposed at any individual monitored site. Distinct monitored sites 110 can have the same number or a different number of monitored devices 120, as might be convenient for operation of the system 100, as described herein. Distinct monitored sites 110 can also have the same types or different types of monitored devices 120, as might be convenient for operation of the system 100, as described herein.

Localized Information Receipt and Analytics

Each monitored site 110 can have an edge RTU (ERTU) 140 disposed at, or otherwise coupled to, that site. The ERTU 140 associated with each monitored site 110 is coupled to the LAN 130 associated therewith, so as to allow the ERTU 140 to receive information (such as data points or alarm signals) from the monitored devices 120 there. The ERTU 140 can receive information from the monitored devices 120 either by hardware connection, or by using a real time monitoring protocol (such as SNMP, Modbus, DNP, BACnet, or variants thereof).

In one embodiment, one or more of the monitored devices 120 can be disposed to publish information using an industry-standard protocol (such as SNMP, Modbus, DNP, BACnet, or variants thereof). The ERTU 140 can also be disposed with an optional device (sometimes called a "dongle") to receive information published in a serial format. The ERTU 140 can be disposed to receive information from the monitored devices 120 at known times, or alternatively, whenever those monitored devices publish new information for review.

In one embodiment, the ERTU 140 can detect when monitored devices 120 publish information using a real time monitoring protocol, whether directly to the ERTU or using the LAN 130. Accordingly, the ERTU 140 can automatically discover those monitored devices 120 available at the monitored site 110. The ERTU 140 can thus receive status messages from the monitored devices 120 at the monitored site 110 without necessarily being configured ahead of time to know about the existence or location of those monitored devices.

Thus, each ERTU 140 can be disposed to receive information from the monitored devices 120 at its associated monitored site 110, such as using an industry-standard protocol, such as SNMP, Modbus, DNP, BACnet, or variants thereof. Each ERTU can also be disposed to collect information from the devices at its associated site in real time and to apply analytics or other processing to that information in real time.

The ERTU 140 associated with its associated monitored site 110 can be coupled to both retrieve and collect information from the monitored devices 120 at that site, in real time. For example, when an ERTU 140 retrieves information from the monitored devices 120 at its monitored site 110, it can package that information into units for sending to another device, such as packaging that information into TCP messages for transmission to a centralized computer using a WAN (as described herein). Each ERTU 140 can also be disposed to apply analytics, statistics, or other information processing, to the data collected at its monitored site 110, in real time, or otherwise when that collected data becomes available. For example, the ERTU 140 can be disposed to compute values of interest in response to individual data points gathered from individual monitored devices 120, such as power utilization efficiency (PUE) or other values operators might find of interest in reviewing the operation of the monitored devices 120. As described herein, each ERTU 140 can send information derived from the analytics performed at its monitored site 110 to a centralized computer (as further described herein).

In one embodiment, the ERTU 140 can be rack-mounted (such as with a 1 or 2 U form factor), locally grounded, disposed to receive power from a DC powerplant, and disposed to supply power over Ethernet (POE) for PoE capable devices 120 on the LAN 130, so as to streamline the ERTU deployment. The ERTU 140 can also be disposed to operate in a telecommunications system with a sufficient range of operating electromagnetic noise, relative humidity, and temperature.

In one embodiment, the ERTU 140 can include an external interface, such as a web interface, by which an operator can provide commands to, and review the status of, the ERTU and the devices 120 it is disposed to monitor. For example, an operator can send requests to the ERTU 140, so as to query its status, and can receive responses from the ERTU with information in response to those requests. For another example, the ERTU 140 can provide one or more alarm signals (or other status information) to one or more operators, such as by updating a database or web page, or by sending one or more user messages (such as email, text messages, MMS messages, social media messages, or another type of message), or another type of communication to an operator.

Wide Area Information Collection

In one embodiment, the ERTU 140, at its associated monitored site 110, can be disposed to couple information from the monitored devices 120 at that site to a centralized computer 150. Each ERTU 140, at its associated monitored site 110, can be coupled to a wide area network (WAN) 160, itself coupled to the centralized computer 150.

The ERTU 140 can receive information it receives from monitored devices 110 and encrypt (or obfuscate, or otherwise protect) that information against unauthorized snooping or modification. Although the ERTU 140 is described as encrypting the information it receives, it need not encrypt all such information; the ERTU can leave some or all of the information unencrypted if desired. The ERTU 140 can package the encrypted information (and if there is any, unencrypted information) into one or more TCP messages, and can send that information to the centralized computer 150 using a reliable and secure communicate protocol (such as a TCP/IP protocol stack, or a variant thereof). Thus, the ERTU 140 can couple information from the monitored devices 120, using the LAN 130 at each monitored site 110, to the centralized computer 150, using the WAN 160.

In one embodiment, communication using the LAN 130, thus, communication between monitored devices 120 and the ERTU 140, is isolated to the monitored site 110. Thus, communication using the LAN 130 is distinct from any communication between the ERTU 140 and the centralized computer 150 using the WAN 160. This can have the effect that addresses associated with one or more monitored devices 120 communicating with the ERTU 140 using the LAN 130 are isolated and distinct from addresses associated with one or more ERTUs communicating with the centralized computer 150 using the WAN 160. Thus, it should not be necessary to change the address assignment scheme for any of the monitored sites 110 for monitored devices 120 on the LAN 130.

In one embodiment, when the ERTU 140 receives information from the monitored site 110 using the LAN 130, each monitored device 120 coupled to the LAN 130 can be associated with a single address in the address space available on the LAN. As described herein, the ERTU 140 can perform analytics at the monitored site 110 and forward information from that site's associated LAN 130 to the centralized computer 150.

In one embodiment, when the ERTU 140 is coupled to the centralized computer 150 using the WAN 160, each monitored site 110 can be associated with a single IP address in the address space available on the WAN. The WAN 160 can be a separate network from any individual LAN 130 associated with an individual monitored site 110; thus, the address spaces of the LANs and the WAN do not collide and are not used up by large numbers of monitored devices 120.

In one embodiment, when the ERTU 140 transmits information from the monitored site 110 to the centralized computer 150, the ERTU can re-associate addresses of individual monitored devices 120 with standardized addresses expected by the centralized computer. For example, when the centralized computer 150 expects a power generator to be associated with a standardized address such as 0.0.0.11 on the LAN 130, the ERTU 140 can re-associate the actual address (such as an address that is assigned by a hardware configuration of the monitored device 120 at the particular monitored site 110) to that standardized address. This can have the effect that the centralized computer 150 does not need to know the particular assignments of each monitored device 120 at each particular monitored site 110.

In one embodiment, when the ERTU 140 transmits information from the monitored site 110 to the centralized computer 150, the ERTU can use a standard protocol agreed-to between the ERTU and the centralized computer. This can have the effect that the centralized computer 150 can receive information with respect to monitored devices 120 without having to know what information transport protocol (such as a real time protocol) each monitored device uses to communicate with the ERTU 140.

In addition to assigning a standardized address and using a standardized communication protocol, the ERTU 140 can also standardize the formatting of its messages to the centralized computer 150, such as to compact the data and use standard positions in its messages where data points and alarm signals are placed.

The ERTU 140 can also standardize the frequency of its messages, and any other aspects of timing of its messages to the centralized computer 150. This can have the effect that the centralized computer 150 can receive information from the ERTU 140 at times and in amounts the centralized computer knows ahead of time, instead of whenever the monitored devices 120 might (asynchronously) report their status. For example, when the ERTU 140 determines that it should transmit information to the centralized computer 150, the ERTU can actively poll, or otherwise collect information from, the monitored devices 120 to obtain their status.

In one embodiment, communication between the ERTU 140 and the centralized computer 150 can be performed outside the bandwidth associated with the telecommunication network. This can have the effect that communication between the ERTU and the centralized computer can be performed without interfering with operation of the telecommunication network.

In one embodiment, the centralized computer 150 can be disposed at one of the locations associated with the monitored sites 110, or at another location such as New York City. Despite being called a "centralized" computer, there is no particular requirement that the centralized computer 150 is disposed in a physically "central" location with respect to the monitored sites 110; instead, the centralized computer can be disposed with respect to the monitored sites in a logically centralized location, as described herein. The ERTU 140 can be disposed to publish information from the monitored devices 120 using an OpenData protocol (or a variant thereof) to the centralized computer 150.

Alternatively, the centralized computer 150 can be disposed as a virtual device, such as a virtual machine (VM) operating on a cloud computing service, a VM operating as a guest host on a server or a cluster computing device, or using another technique for providing computing services logically remote from the monitored sites 110. For example, the centralized computer 150 can include a database disposed using a cloud computing service. For another example, the centralized computer 150 can be disposed to be accessible from a web API, thus eliminating any particular need for specialized hardware to operate and access the centralized computer 150.

Centralized Information Reporting

In one embodiment, the centralized computer 150 can receive information from the ERTUs 140, to provide a collective perspective with respect to monitored devices 120 at all monitored sites 110. In one embodiment, the centralized computer 150 can forward that information to other processors, or can process that information itself, so as to allow an operator to (A) identify a status of the monitored location, (B) identify an alarm condition that might occur at the monitored location, (C) report on a trend with respect to the monitored location, or otherwise.

In one embodiment, the centralized computer 150 can be disposed to provide computing services for one or more reporting applications 170. For example, the reporting applications 170 can include one or more condition monitoring applications, one or more "live dashboard" applications showing current or past status of monitored devices 120, one or more trending/monitoring applications showing changes of status and directions of those changes, one or more deep learning applications, or other applications showing information (or statistical characteristics thereof) with respect to monitored devices 120.

In one embodiment, when the centralized computer 150 includes a database accessible from a web API, as described herein, one or more of the reporting applications 170 can retrieve information from that database, perform analytics, statistics, or other information processing, to that retrieved data, and generate a presentation for an operator or other user of the system 100. The presentation can be displayed to the user or can be recorded, such as a set of still images or an electronic report, for later review by the user, or for archive.

FIG. 2—RTU Receiving Information from Legacy Telemetry

FIG. 2 shows a conceptual drawing of an alternative example system, including a first set of monitored devices coupled to a legacy telemetry unit (RTU), which is in turn coupled to a newer ERTU.

Legacy Telemetry Devices

A system 200 can include one or more monitored sites 110, each monitored site including one or more monitored devices 120 and disposed at a location associated with that monitored site, as described with respect to FIG. 1.

The monitored site 110 can include a first set of monitored devices 120 coupled to a legacy RTU (LRTU) 141. The first set of monitored devices 120 can include legacy monitored devices only generally capable of communicating with the LRTU 141 using hardwired physical sensors and contact closures. In such cases, the LRTU 141 can be disposed to collect information from the first set of monitored devices 120 using those hardwired physical sensors and contact closures.

The monitored site 110 can include a second set of monitored devices 120 coupled to an ERTU 142, similar to the ERTU 140 described with respect to FIG. 1. The second set of monitored devices 120 can include newer monitored devices capable of communicating with the ERTU 142 using a real time monitoring protocol (such as SNMP, Modbus, DNP, BACnet, or a variant thereof), as also described with respect to FIG. 1. In such cases, the ERTU 140 can be disposed to collect information from the second set of monitored devices 120 using those real time monitoring protocols, as also described with respect to FIG. 1.

The LRTU 141 can be coupled to the ERTU 142 using a real time monitoring protocol, either directly or using the LAN 130 associated with the monitored site 110. Thus, legacy monitored devices 120 can communicate information to the LRTU 141 directly, using hardwired physical sensors and contact closures, and the LRTU can communicate that information (including data points and alarm signals) to the ERTU 142 using a real time monitoring protocol (either directly or using the monitoring site's LAN 130).

Newer Telemetry Devices

The newer monitored devices 120 can communicate directly with the ERTU 142 using a real time monitoring protocol, such as using the monitoring site's LAN 130, as described with respect to FIG. 1. The ERTU 142 can communicate information to the centralized computer 150 using the WAN 160, in a reliable and secure manner, and at defined times and using defined communication protocols.

This can have the effect that both the legacy monitored devices and the newer monitored devices can each communicate information to the ERTU 142, either indirectly using the LRTU 141 (for legacy monitored devices) or directly using the monitoring site's LAN 130 (for newer monitored devices). The ERTU 142 can communicate information it receives from the LRTU 141, along with information it receives from the newer monitored devices 120, to the centralized computer 150 using the WAN 160. Communication between the ERTU 142 and the centralized computer 150 can be performed in a similar manner as described with respect to FIG. 1.

This can have the effect that the ERTU 142 can perform analytics, statistics, and other information processing, on information it receives from both the legacy monitored devices 120 and the newer monitored devices 120, without any particular physical wiring or special physical configuration.

This can also have the effect that the centralized computer 150 can receive information from both the legacy monitored devices 120 and the newer monitored devices 120 without having to know the addresses associated with those monitored devices 120, or the specific hardwired physical sensors or contact closures, or the particular real time monitoring protocol being used by those monitored devices 120.

Upgrading Telemetry Devices

In one embodiment, legacy monitored devices at the monitored site 110 can be upgraded to newer monitored devices. When the newer monitored devices are able to use local network protocols, so as to be able to directly communicate with the ERTU 142, they can be decoupled from the LRTU 141 and recoupled to the ERTU 142. This can have the effect that, as legacy monitored devices are replaced by newer monitored devices, more information from monitored devices 120 can be communicated directly to the centralized computer 150, and the centralized computer 150 can obtain a more detailed view of the monitored site 110. When all of the legacy monitored devices at the monitored site 110 have been replaced by newer monitored devices, the LRTU 141 can be removed from the monitored site 110 and the ERTU 142 can be used alone.

ALTERNATIVE EMBODIMENTS

While this Application primarily describes a system and methods related to communication from monitored devices to an ERTU and thence to a centralized computer, alternative embodiments can include the reverse communication, thus, from a remote controller to an ERTU and thence to one or more monitored devices. In such cases, the centralized computer, having authenticated itself to the ERTU, can be disposed to query a monitored device (at a selected site) for selected information, to alter the state of a monitored device, to issue commands to a monitored device, or otherwise.

After reading this Application, those skilled in the art will recognize that the techniques described herein are applicable to a wide variety of different types of monitored devices and equivalents thereof; to a wide variety of information received from the monitored devices and their status; to a wide variety of types of monitored devices; or otherwise.

This Application describes a preferred embodiment with preferred process steps and, where applicable, preferred communication techniques or data structures. After reading this Application, those skilled in the art would recognize that, where any calculation or computation is appropriate, embodiments of the description can be implemented using general purpose computing devices or switching processors, special purpose computing devices or switching processors, other circuits adapted to particular process steps and communication techniques or data structures described herein, or combinations or conjunctions thereof, and that implementation of the process steps and communication techniques or data structures described herein would not require undue experimentation or further invention.

The claims are incorporated into the specification as if fully set forth herein.

The invention claimed is:

1. A system including
a plurality of physically or logically distinct monitored locations, each monitored location having a plurality of monitored devices and an edge remote telemetry unit (ERTU) coupled thereto;
each ERTU being disposed to receive sensor information asynchronously from selected monitored devices at its associated monitored location, the selected monitored devices being associated with local addresses of the monitored devices in a first address space associated with the monitored location and isolated from each other monitored location;
each ERTU being disposed to provide one or more messages from its associated monitored location synchronously to a centralized computer using a reliable and secure remote communication protocol, the remote communication protocol being associated with addresses of the ERTUs in a second address space isolated from each of the first address spaces;
each ERTU being disposed, when sending information to the centralized computer, to re-associate each address of a monitored device with a standardized address expected by the centralized computer for that monitored device, each standardized address being unique to that monitored device across all monitored locations, wherein the centralized computer can specify communication with a selected monitored device without knowing a local address for that selected monitored device.

2. A system as in claim 1, wherein
each ERTU is disposed to auto-discover individual monitored devices at its associated monitored location to receive status information from those monitored devices without being coupled using direct hardware connections and without being configured for particular locations of those monitored devices.

3. A system as in claim 1, wherein
each ERTU is disposed to perform information processing on status information it receives with respect to monitored devices;
wherein the ERTU is disposed to send information derived from its information processing to the centralized computer.

4. A system as in claim 1, wherein
each ERTU is disposed to receive sensor information from monitored devices at its associated monitored location using a local area network.

5. A system as in claim 1, wherein
each ERTU is disposed to receive sensor information from monitored devices at its associated monitored location using a direct hardware connection.

6. A system as in claim 1, wherein
each ERTU is disposed to receive sensor information from monitored devices at its associated monitored location using a real time monitoring protocol.

7. A system as in claim 1, wherein
each ERTU is disposed to standardize addressing of monitored devices, associating like devices with like addresses in an address space associated with each monitored location;
the centralized computer is disposed to identify status information with respect to individual monitored devices at each monitored location, without knowing how those individual monitored devices are coupled to the ERTU or what information transport protocol those individual monitored devices use when communicating with the ERTU.

8. A system as in claim 1, wherein
each ERTU is rack-mounted, locally grounded, and draws power over ethernet (PoE) from a connection at its monitored location.

9. A system as in claim 1, wherein
each monitored location includes a local area network coupled to a set of monitored devices.

10. A system as in claim 1, wherein
each monitored location is associated with a single known WAN address distinct from the LAN addresses used by each ERTU at the ERTU's monitored location.

11. A system as in claim 1, wherein
the centralized computer is coupled to a wide area network coupled to a set of ERTUs;
each ERTU provides at least partially encrypted messages to the central computer using a protocol having reliable delivery.

12. A system as in claim 1, wherein
the centralized computer is disposed to process information from the ERTUs;
the centralized computer provides to an operator one or more of:
information sufficient to identify a status of a monitored location, information sufficient to identify an alarm condition at a monitored location, information sufficient to report on a trend with respect to a monitored location.

13. A system as in claim 1, wherein
the centralized computer is disposed to receive information from the ERTUs, to provide a collective perspective on all locations.

14. A system as in claim 1, wherein
the system includes a telecommunication system;
communication between the ERTU and the centralized computer is disposed to be performed outside the bandwidth associated with the telecommunication system.

15. A system as in claim 1, wherein
each ERTU standardizes formatting and timing of messages to the centralized computer; the centralized computer is disposed to receive status information with respect to individual monitored devices at each monitored location, independent of when those individual monitored devices report their status information.

16. A system as in claim 15, wherein
each ERTU actively receives status information from the monitored devices at times when the ERTU determines that it is desirable to send that information to the centralized computer.

17. A system including
a plurality of monitored locations, each monitored location having one or more monitored devices and an edge remote telemetry unit (ERTU) coupled thereto;
at least one monitored site having one or more legacy monitored devices coupled to a legacy remote telemetry unit (LRTU) using one or more of: hardwired physical sensors or contact closures;
the LRTU disposed to provide status information to the ERTU with respect to the legacy monitored devices associated therewith;
each ERTU being disposed to receive sensor information asynchronously from selected monitored devices at its associated monitored site, the selected monitored devices being associated with local addresses of the monitored devices in a first address space associated with the monitored location and isolated from each other monitored location;
each ERTU being disposed to provide one or more messages from its associated monitored location synchronously to a centralized computer using a reliable and secure remote communication protocol, the remote communication protocol being associated with addresses of the ERTUs in a second address space isolated from each of the first address spaces;
each ERTU being disposed, when sending information to the centralized computer, to re-associate each address of a monitored device with a standardized address expected by the centralized computer for that monitored device, each standardized address being unique to that monitored device across all monitored locations, wherein the centralized computer can specify communication with a selected monitored device without knowing a local address for that selected monitored device.

* * * * *